No. 675,341. Patented May 28, 1901.
J. T. RICE.
TIME AND WAGE INDICATOR.
(Application filed Aug. 30, 1900.)
(No Model.) 2 Sheets—Sheet 1.
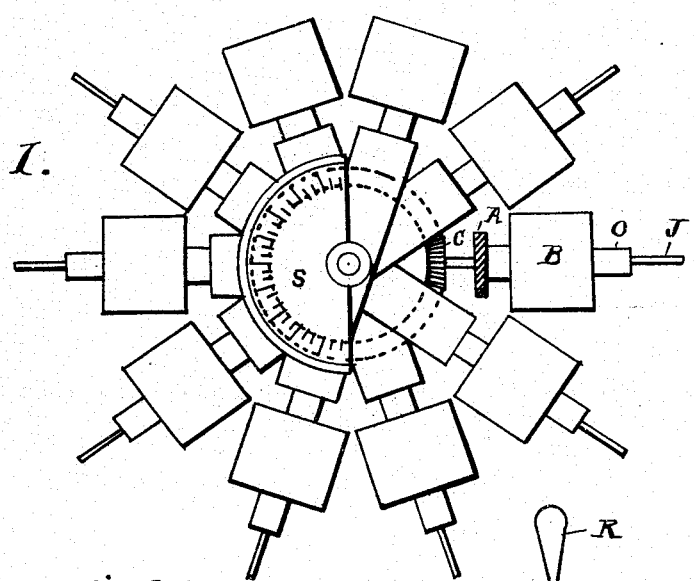
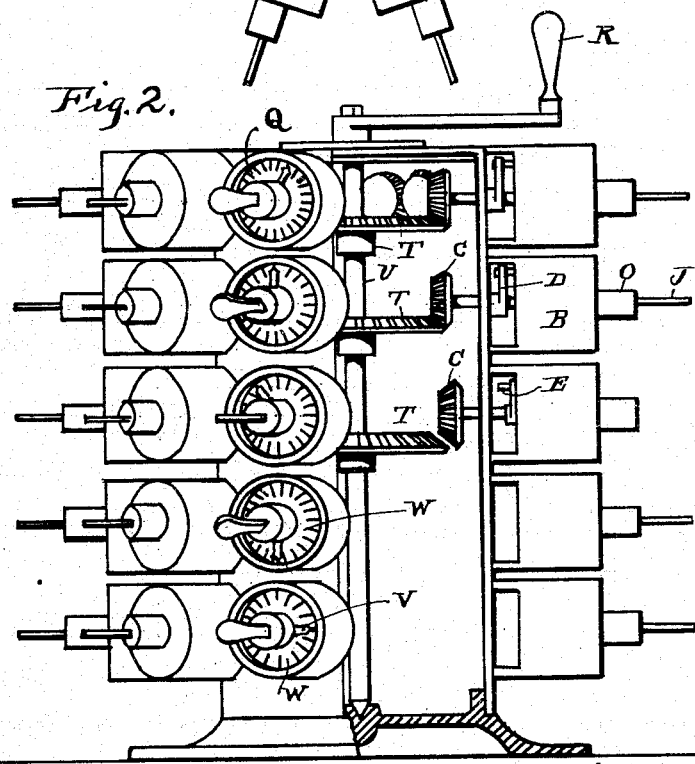

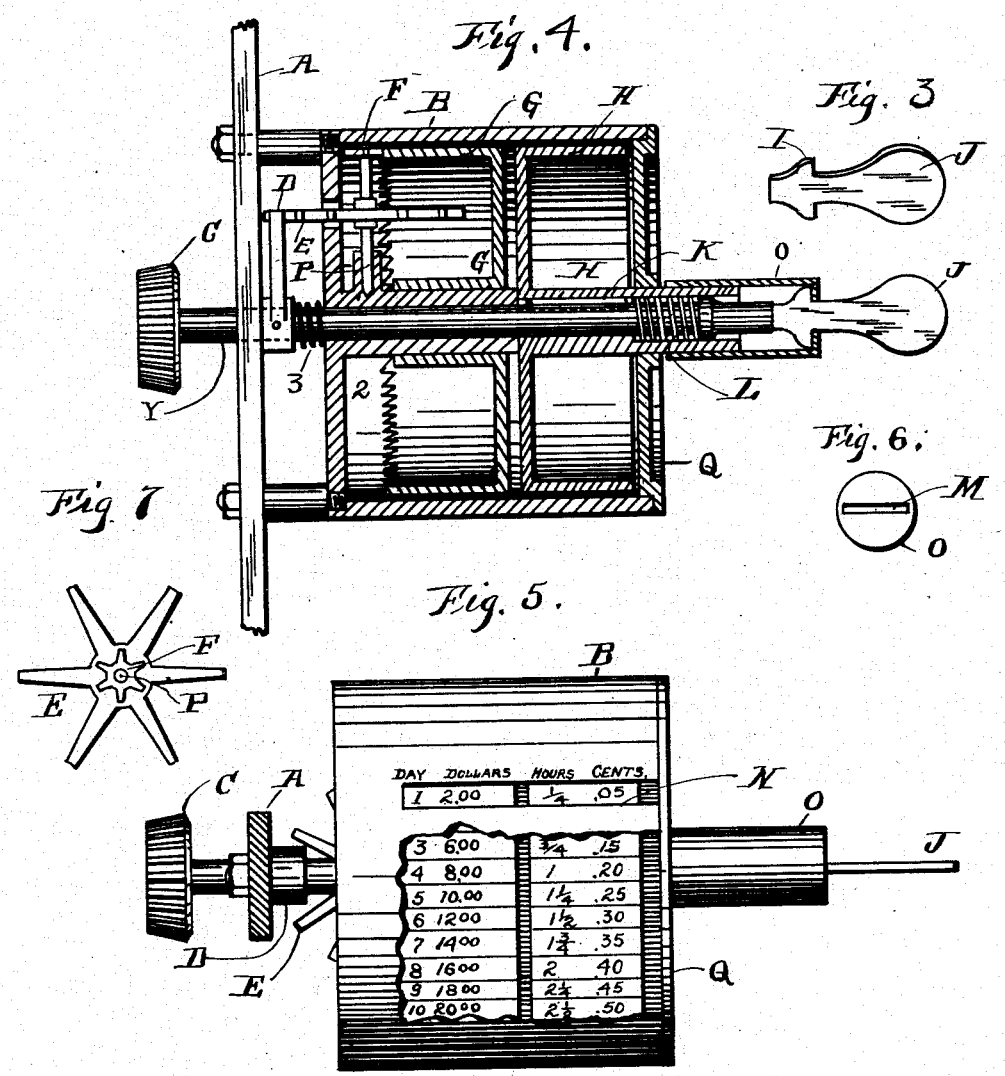

UNITED STATES PATENT OFFICE.

JESSE T. RICE, OF GRAND RAPIDS, MICHIGAN, ASSIGNOR OF ONE-HALF TO GEORGE H. GILDERSLEEVE, OF SAME PLACE.

TIME AND WAGE INDICATOR.

SPECIFICATION forming part of Letters Patent No. 675,341, dated May 28, 1901.

Application filed August 30, 1900. Serial No. 28,603. (No model.)

*To all whom it may concern:*

Be it known that I, JESSE T. RICE, a citizen of the United States, residing at Grand Rapids, in the county of Kent and State of Michigan, have invented new and useful Improvements in Time and Wage Indicators, of which the following is a specification.

This invention relates to a new and useful time and wage indicator; and the invention consists in the combination and arrangement of parts particularly described and claimed in this specification; and the objects of my invention are, first, to combine a series of individual indicators with a central mechanism whereby all the individual indicators can be operated at once; second, to furnish for each workman an individual indicator that will accurately indicate at all times the exact length of time he has labored and the exact sum of money he has earned, and, third, to furnish a combined time and wage indicator simple in construction, efficient in operation, and which cannot get out of repair by any ordinary usage. These objects I accomplish by means of the mechanism illustrated in the accompanying drawings, in which—

Figure 1 shows a plan view of a series of individual indicators supported on a suitable frame and arranged around a central operating-shaft, a part of the frame being cut away to show the gear connection. Fig. 2 shows a side elevation, partly in section, of a frame containing several series of individual indicators. Fig. 3 shows my preferred form of key which is used by the workman and which connects the gear of the individual indicator with the gear on the central shaft of the supporting-frame. Fig. 4 shows a sectional view of one of the individual indicators, illustrating the working parts of this mechanism. Fig. 5 is a plan view of the individual indicator with a part of the outer shell cut away, showing the arrangement of figures indicating the time worked and amount of money earned. Fig. 6 is an outer end view of the projecting part O, showing the keyhole or slot. Fig. 7 is a detached plan view of the mechanism which conveys the motion from shaft of the individual indicator to the cylinder which contains figures indicating days and days' wages.

Like characters refer to like parts throughout the several views.

A represents the frame, which supports both the central shaft and the individual indicators. This frame A may be constructed of any suitable form and of any suitable material.

B is the outer shell of the individual indicator and is preferably constructed of metal and provided with an inwardly-extending hub. It is secured to the supporting-frame A and is provided with a gear-wheel C, which is adapted to engage with a large gear on the central shaft, as hereinafter described.

H is a cylinder carrying figures indicating hours and parts of hours, with figures indicating cents so placed as to correspond with the figures indicating hours and fractions of hours—that is, opposite each figure indicating hours or fractional parts thereof there are placed figures indicating the amount of money or number of cents earned during the time indicated. The cylinder H is secured to the shaft Y by means of a key K, which causes the cylinder to revolve with the shaft, but allows the shaft to be moved longitudinally for the purpose of engaging the gear C with the gear on the drive-shaft and disengaging the same therefrom. For convenience I provide a cylindrical projection O, which revolves with the cylinder H. The projection O is provided with the keyhole M. (Shown in Fig. 6.)

L is a spring of any suitable form, which bears against a shoulder on the shaft Y at one end and against a shoulder rigid with the cylinder H at the other end. Instead of placing the spring near the front, as shown by L, it may be placed near the opposite side, as shown by 3 in Fig. 4. The operation of the spring is precisely the same in either position.

D is the key, which is provided with a shoulder I, as shown. The operation of this part of my invention is as follows: The key is passed through the keyhole M, and the inner end of the key pushes or moves the shaft Y until the gear C is in engagement with the gear T on the main shaft of the frame. The key D is then turned until the shoulder I engages with the inner shell of O, which retains said gears in engagement. In Fig. 4 the key is shown in place to retain the gears C and T in engagement. When the key is removed, the spring L will immediately draw the gear C out of engagement with the gear T. The exposed end of the individual indicator is provided with a disk Q. Over this disk I place a dial-plate W, of paper or other suitable material, which dial is marked to indicate hours and fractional parts of hours, and secured with cylinder H on shaft Y is an indicator V, which is moved by the movement of the shaft Y and can be readily moved when the gears are not connected to indicate any number of hours or fractions thereof.

G is a cylinder mounted on the shaft Y, but moving independently thereof. This cylinder G is provided with figures indicating days and figures indicating the wages earned—that is, opposite the number of days are figures indicating the amount of wages earned by the workman for the time indicated. The shaft Y is provided with an arm D, which at each revolution of the shaft Y engages with one of the arms of the star-wheel E and moves the star-wheel forward one notch. The star-wheel E is rigid with its shaft P, and the shaft P also covers the small wheel F. The wheel F has cogs or teeth engaging with the notches 2 on the cylinder G, and each revolution of the shaft Y moves the cylinder G forward one notch. By this construction the cylinder H makes a complete revolution in the same time that cylinder G moves forward one notch, and the cylinder H marks hours and parts of hours, while cylinder G only indicates days. The shell B is provided with a slot. (Shown in Fig. 5 by N.) This slot discloses the figures on both cylinders above described. In the example shown in said Fig. 5 the figures on cylinder G show one day and two dollars as the amount earned and the figures on cylinder H show one-quarter of an hour as the time employed and five cents as the amount earned. In the ordinary use of my device if a workman continues to work for ten hours the cylinder H would at the end of the ten hours be advanced to indicate that amount of time and the cylinder G would be advanced another day and would indicate two days worked and four dollars earned.

The frame A is supported upon any suitable base, and its drive-shaft U projects above the supporting-frame and is provided with a crank R for revolving the shaft. A series of the individual indicators are arranged around the central shaft, and for each series the shaft is provided with a large gear T. I have shown ten individual indicators in each series and five of these series, making fifty indicators in all. It will be understood that the numbers in the series are the number of series and may be varied. In the drawings the individual indicators shown with the key in place are in gear with the gear in the central shaft, and those indicators without the keys are out of gear with the gear of the central shaft.

I have described above my preferred form of construction; but many modifications in detail and construction may be made without departing from the spirit of my invention.

On the upper end of the shaft U, I place a dial S, which is preferably divided so as to indicate sixty hours, or, in all, six working days of ten hours each. The spaces indicating hours are preferably subdivided so as to designate fractions of hours. The subdivision on the face of this dial S and of the other dials may be adapted to longer or shorter periods without departing from my invention. The figures in the individual indicators indicating time and indicating wages are printed, preferably, on strips of paper and placed on the cylinders, which cylinders are so constructed that strips can be easily applied. The figures are of the kind to indicate at all times the rate of wages paid, each individual indicator having a strip to indicate the rate of wages of the workman using the indicator.

The operation of my invention is as follows: The time and wage indicator complete is preferably inclosed in a surrounding case and placed in the room where the workmen using the device are at work. Each workman is provided with a key bearing a number or other mark to correspond with the individual indicator to be used by the workman. The case is opened before the time for work begins in the morning. As the workmen come to the factory each man puts his key into the keyhole of his indicator, pushes the key in, turns the same, and then connects his indicator with the central gear and the keys are all left in place. When the men are all in and at work, the foreman or other person having the matter in charge locks the case and it remains locked until noon, when the foreman unlocks the case and by means of the crank R moves forward the indicator on the face of the dials W and the cylinders H, so that the figures shown through the slot M will indicate the number of hours worked by each man and the amount of wages earned. In the afternoon the operation is repeated, and the cylinders H will show the number of hours worked by each man and amount of wages earned by each man, and the cylinder G will indicate the number of days and wages by days.

In case a workman should come late he finds the case locked and goes to the foreman. The foreman carefully notes the time of his arrival and opens the case and sets back the indicator and cylinder H of the workman's indicator to indicate the loss of time occasioned by the tardiness—for instance, if the workman is one hour late his indicator is set back one hour before the key is inserted making connection with the gear on the main shaft, and when the indicators are moved forward at noon the indicator of the tardy workman will show that he has lost one hour. If a workman stops work before noon—say at eleven o'clock—the foreman sets back his indicator one hour, and when all the indicators are advanced at noon the indicator of the workman quitting work at eleven o'clock will show that he has lost one hour. I have given above one form of using my time and wage indicator, but after hours may be used, and each foreman will use the same in the best manner to suit his convenience.

Having thus described my invention, what I claim to have invented, and desire to secure by Letters Patent, is—

1. In a time and wage indicator, a drive-shaft, a gear-wheel carried thereby, operating means for said shaft, a series of spring-actuated shafts circumferentially surrounding said shaft, means to permit of the longitudinal movement of said spring-actuated shafts, a rotary indicator mounted upon said shaft and operated thereby, a rotary indicator, operating means therefor, an arm carried by each of said spring-actuated shafts for operating the operating means for the last-named rotary indicator, and means engaging said spring-actuated shafts for causing the intermeshing of said gear-wheels.

2. In a time and wage indicator, a casing provided with a suitable slot and an inwardly-extending hub, a spring-actuated longitudinally-moving shaft extending therethrough, a rotary hour-indicator arranged within said casing and mounted upon said shaft, a day-indicator arranged within said casing, operating means for said shaft rotating thereby said hour-indicator, and means operated by said shaft for intermittently rotating said day-indicator.

3. In a time and wage indicator, a drive-shaft, a gear-wheel carried thereby, operating means for said shaft, a casing, a spring-actuated shaft extending therethrough, a gear-wheel carried by said spring-actuated shaft, a rotary hour-indicator arranged within said casing and mounted upon said shaft, a day-indicator arranged within said casing, means for causing the meshing of said gear-wheels imparting motion thereby to said spring-actuated shaft and operating said hour-indicator, and means operated by said spring-actuated shaft for intermittently rotating said day-indicator.

4. In a time and wage indicator, a casing provided with a suitable slot, a spring-actuated longitudinally-moving shaft extending therethrough, a rotary hour-indicator arranged within said casing and mounted upon said shaft, a day-indicator arranged within said casing, operating means for said shaft rotating thereby said hour-indicator, means for operating said day-indicator, and an arm carried by said shaft for intermittently operating said means for operating the day-indicator.

In testimony whereof I have hereunto set my hand in presence of two subscribing witnesses.

JESSE T. RICE.

Witnesses:
EDWARD TAGGART,
ELIZABETH J. PHILLIPS.